(12) United States Patent
Barbieri et al.

(10) Patent No.: US 8,700,556 B2
(45) Date of Patent: Apr. 15, 2014

(54) BIASED RECOMMENDER SYSTEM BASED ON AGE PARAMETER

(75) Inventors: Mauro Barbieri, Eindhoven (NL); Serverius Petrus Paulus Pronk, Vught (NL)

(73) Assignee: Axel Springer Digital TV Guide GmbH, Berlin (DE)

( * ) Notice: Subject to any disclaimer, the term of this patent is extended or adjusted under 35 U.S.C. 154(b) by 179 days.

(21) Appl. No.: 12/998,947

(22) PCT Filed: Dec. 15, 2009

(86) PCT No.: PCT/EP2009/067153
§ 371 (c)(1),
(2), (4) Date: Sep. 7, 2011

(87) PCT Pub. No.: WO2010/072616
PCT Pub. Date: Jul. 1, 2010

(65) Prior Publication Data
US 2012/0054144 A1  Mar. 1, 2012

(30) Foreign Application Priority Data
Dec. 23, 2008  (EP) .................................. 08172774

(51) Int. Cl.
*G06F 9/44* (2006.01)
*G06N 7/02* (2006.01)
*G06N 7/06* (2006.01)

(52) U.S. Cl.
USPC ........................................................... 706/52

(58) Field of Classification Search
None
See application file for complete search history.

(56) References Cited

U.S. PATENT DOCUMENTS

| | | | |
|---|---|---|---|
| 2006/0059165 A1* | 3/2006 | Bosloy et al. | 707/10 |
| 2006/0254409 A1 | 11/2006 | Withop | |
| 2006/0294132 A1 | 12/2006 | Hsieh et al. | |
| 2008/0222106 A1 | 9/2008 | Rao et al. | |
| 2010/0042608 A1* | 2/2010 | Kane, Jr. | 707/5 |

OTHER PUBLICATIONS

Gordea et al. "Time Filtering for Better Recommendations with Small and Sparse Rating Matrices", WISE 2007, pp. 171-183.*
Ding et al. "Time Weight Collaborative Filtering", CIKM 2005, pp. 485-492.*
Sergiu Gordea et al.; "Time Filtering for Better Recommendations with Small and Sparse Rating Matrices"; Web Information Systems Engineering A Wise 2007 (Lecture Notes in Computer Science); Dec. 3, 2007; pp. 171-183; vol. 4831, XP019083984, ISBN: 978-3-540-76992-7; Springer Berlin Heidelberg; Berlin.
Yi Ding et al.; "Time Weight Collaborative Filtering"; Proceedings of the 14th ACM International Conference on Information and Knowledge Management; Oct. 31, 2005; pp. 485-492, XP002525462, Internet URL: http://portal.acm.org/citation.cfm?doid=1099689.
Mikael Sollenborn et al.; "Category-Based Filtering and User Stereotype Cases to Reduce the Latency Problem in Recommender Systems"; Lecture Notes in Computer Science, Advances in Case-Based Reasoning; Sep. 4, 2002; pp. 395-405; vol. 2416/2002, XP002289360; Spinger-Verlag Berlin Heidelberg; Berlin.
Robin Burke; "Hybrid Recommender Systems: Survey and Experiments"; User Modeling and User-Adapted Interaction; Nov. 1, 2002; pp. 331-370; vol. 12, No. 4, XP019269964, ISSN: 1573-1391; Kluwer Academic Publishers; Netherlands.

* cited by examiner

*Primary Examiner* — Li-Wu Chang
(74) *Attorney, Agent, or Firm* — Ware, Fressola, Maguire & Barber LLP

(57) ABSTRACT

The present invention relates to an apparatus, a method and a computer program product for controlling a recommender system, wherein a bias is applied to the output of a recommender in order to favour newly added services and content sources. The bias may decay in time and/or with the number of ratings given to content coming from the new service.

13 Claims, 1 Drawing Sheet

BIASED RECOMMENDER SYSTEM BASED ON AGE PARAMETER

CROSS REFERENCE TO RELATED APPLICATIONS

This application is the U.S. National Stage of International Application No. PCT/EP2009/067153 filed on Dec. 15, 2009 which was published in English on Jul. 1, 2010 under International Publication Number WO 2010/072616.

DESCRIPTION

1. Field of the Invention

The present invention relates to an apparatus, a method, and a computer program product for controlling a recommender system for at least one content item.

2. Background of the Invention

Hard-disk drives and digital video compression technologies have created a possibility of time-shifting live television (TV) and recording a large number of TV shows in high quality without having to worry about the availability of tapes or other removable storage media. At the same time, digitalization of audiovisual signals has multiplied the number of content sources for an average user. Hundreds of channels are available using a simple parabolic antenna and a TV receiver. Huge amounts of video clips are published daily on the Internet across various services, and all major content producers are already making their entire content libraries available online. As a consequence, thousands of potentially increasing programs are made available every day and can be recorded and stored locally for later access.

However, in view of this enormous amount of offered content items, individual content selection becomes an important issue. Information that does not fit to a user profile should be filtered out and the right content item that matches a user's needs and preferences (e.g. user profile) should be selected.

Recommender systems address these problems by estimating a degree of likeliness of a certain content item for a certain user profile and automatically ranking the content item. This can be done by comparing a content item's characteristics (e.g. features, metadata, etc.) with a user profile or with similar profiles of other users. Thus, recommender systems can be seen as tools for filtering out unwanted content and bringing interesting content to the attention of the user.

The use of recommender technology is steadily being introduced into the market. Among various examples, websites offer a recommender to support users in finding content items (e.g. movies) they like, and electronics devices (e.g. personal video recorders) use recommender for automatic filtering content items. Recommender systems are increasingly being applied to individualize or personalize services and products by learning a user profile, wherein machine learning techniques can be used to infer the ratings of new content items.

Commonly used recommender techniques are collaborative filtering and naïve Bayesian classification. Thereby, from a vast amount of content items, only those items that match a profile of a user or group of users can be retrieved. Recommenders are typically offered as stand-alone services or units, or as add-ons (e.g. plug-ins) to existing services or units. They increasingly appear in consumer devices, such as TV sets or video recorders. Recommenders typically require user feedback to learn a user's preferences. Implicit learning frees the user from having to explicitly rate items, and may by derived by observing user actions such as purchases, downloads, selections of items for play back or deletion, etc. Detected user actions can be interpreted by the recommender and translated into a rating. For example, a recommender may interpret a purchase action as positive rating, or, in case of video items, a total viewing duration of more/less than 50% may imply a positive/negative rating.

When a user subscribes to a new service (e.g. a broadcast channel, a video-on-demand service, an Internet video website, etc.), he/she would like and expects to see content from the newly subscribed service. However, when access to the content is mediated by a recommender system (e.g. as in a personal TV concept), the probability that a content item from a new content source is recommended to the user may be low because the newly added service is interpreted by the recommender system as only one other content service added to a pool of existing content services, and therefore there is no special reason why a content item from the newly acquired content service should be preferred. Moreover, initially, the recommender's profile does not contain any ratings related to the newly acquired content service. This may result in an inadequate selection of a newly acquired content service and thus to a sub-optimal operation of the recommender system.

SUMMARY OF THE INVENTION

It is an object of the present invention to provide an improved recommender operation, by means of which content items of newly acquired content services are adequately rated and/or recommended.

This object is achieved by an apparatus as claimed in claim 1, a method as claimed in claim 10, and a computer program product as claimed in claim 13.

The apparatus comprises a recommender for calculating a predicted rating value of a content item (e.g. based on metadata or a collaborative filtering techniques etc.) received from a content source. According to the invention, this rating value is corrected by means of an age determinator and a biasing unit. The age determinator is adapted to derive an age parameter from at least one of said metadata and a number of rating values obtained from a user or predicted for received content items of said content. The biasing unit is adapted to generate a correction value based on the age parameter and to apply the correction value thus generated to the predicted rating value. Thus, the predicted rating value is corrected based on the age of subscription to the content source, which may be determined for example based on the metadata used for calculating the rating value.

Metadata shall mean any information added or associated to a particular content item to be rated, i.e. "data about data", of any sort in any media. An item of metadata may describe an individual content item, or a collection of data including multiple content items and hierarchical levels, for example a database scheme. Additionally, the metadata may be definitional data that provides information about or documentation of other a content item. Or group of content items. For example, metadata may document data about data elements or attributes (name, size, data type, etc) of a content item or group of content items, and data about records or data structures (length, fields, columns, etc) of a content item or group of content items, and data about data (where it is located, how it is associated, ownership, etc.) of a content item or group of content items. Metadata may also include descriptive information about the context, quality and condition, or characteristics of the content item or group of content items. Accordingly, the output result or rating of a recommender can be biased in order to favour newly added services and content sources. In this way, content items received from newly acquired content services are preferably recommended and thus more preferably selected, so that content items received from such new services or sources are recommended more often.

According to a first aspect, the age determinator may comprise a determinator for determining a subscription time (e.g. based on the metadata), and a calculator for calculating the age parameter based on the subscription time and an actual time. Thereby, a straight forward way for assessing oldness of the source of a content item can be provided. The subscription time provided by the metadata of the content item is compared to the actual time or time instant, so that a direct measure of the oldness or degree of novelty can be obtained.

According to a second aspect which can be combined with the above first aspect, the age determinator may be adapted to determine the subscription time by accessing a look-up table. The look-up table may store a relation between a source identification or identifier and the subscription time, so that the subscription time can be provided in an easy and fast manner. The look-up table may be stored in a programmable memory, so that it can be updated whenever a subscription to a new content source has been initiated. As an alternative, the subscription time may be stored in a service profile of the concerned user.

According to a third aspect which can be combined with any one of the above first and second aspects, the biasing unit may be adapted to decrease the correction value with increasing age parameter or with increasing number of rating values given by a user or predicted by the recommender for received content items of the content source. Thereby, the bias applied to the output of the recommender decays in time and/or with the number of ratings given to content items received from a new content source.

In a specific example, the biasing unit may be adapted to decrease the correction value in a linear or exponential relation to time or the number of rating values.

According to a fourth aspect which can be combined with any one of the above first to third aspects, the recommender may be adapted to calculate said predicted rating value in a range [0, 1]. Thus, the output or predicted rating of the recommender can be provided in the form of a probability between the values "0" and "1", which can be used to indicate the user preference as a like-degree where "0" indicates "dislike" and "1" indicates "like". Of course, any other kind or type of value could be used as well (e.g. 5-stars scale).

According to a fifth aspect which can be combined with any one of the above first to fourth aspects, the age parameter may be a novelty value which indicates how long the content source has been available in the recommender system. In a specific example, the novelty value may be a positive real number less than or equal to 1. The novelty value can be set to "1" when a content source is added to the recommender system for the first time, so that the biased output value of the recommender will be controlled to its maximum value.

According to a sixth aspect which can be combined with any of the above first to fifth aspects, the age parameter may represent the age of subscription to the content source, and the correction value may result in a higher rating value for younger subscriptions.

According to a seventh aspect which can be combined with any one of the above first to eighth aspects, an update of a content pre-selection filter may be triggered in response to an addition of a new content source. Thereby, it can be assured that content items received from the new source will pass the pre-selection filter.

According to an eighth aspect which can be combined with any one of the above first to seventh aspects, a user input operation for allocating a personal channel to the new content source may be triggered in response to the addition of a new content source. Here, "personal channel" is intended to mean that the channel has associated a new pre-selection filter. Thus, subscription to a new service or a new content source triggers a dialogue with the user to select or create a new personal channel (i.e. with associated pre-selection filter) for the new content source. In case of a recommender system for a personal TV set, a new TV station received by a satellite service (e.g. a free-to-air satellite TV service) is automatically recommended by the recommender if it has been selected as a new content source, e.g., in a user profile (such as My Personal TV guide).

It is noted that the above control or recommender apparatus can be implemented as discrete hardware circuitry with discrete hardware components, as an integrated chip, as an arrangement of chip modules, or as a signal processing device or computer device or chip controlled by a software routine or program stored in a memory.

BRIEF DESCRIPTION OF THE DRAWINGS

The invention will now be described, by way of example, based on embodiments with reference to the accompanying drawings, wherein.

DESCRIPTION OF EMBODIMENTS

Embodiments of the present invention will now be described based on an exemplary recommender system which generates ratings on content items, such as books, TV programs, movies, etc.

Figure 1:
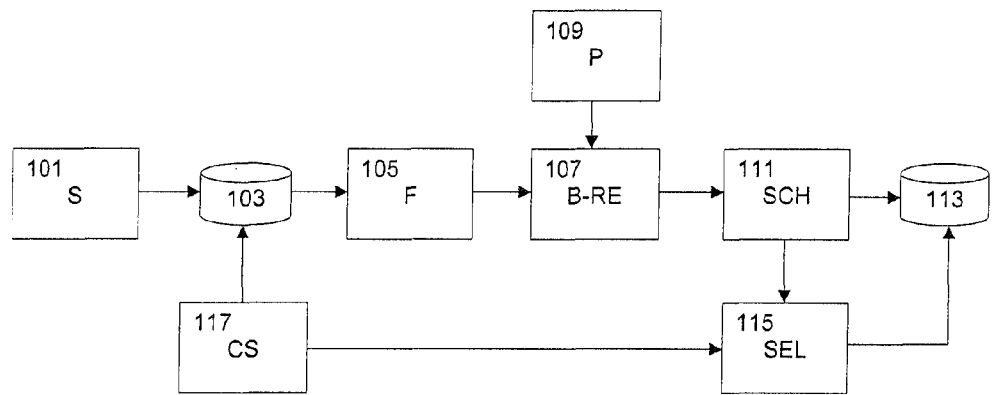
FIG. 1 shows a schematic block diagram of a recommender system according to an embodiment of the present invention.

Fig. 1 shows a schematic block diagram of a recommender system which comprises an information data store 103 connected to a source (S) 101. The source 101 may, for example, be an electronic program guide (EPG) service on the Internet, which provides information data on TV programs. The information data store 103 can be connected to at least one pre-selection filter (F) 105 which is associated with a personalized content channel and filters content items accordingly. It is noted that any number of personalized content channels could be provided. The output of the pre-selection filter 105 is connected to a respective biased recommender engine (B-RE) 107. Thus, each personalized content channel may have an own biased recommender engine 107 associated therewith. Each biased recommender engine 107 and hence personalized content channel has a profile (P) 109 associated therewith. The output of the biased recommender engine 107 is connected to a scheduler (SCH) 111. The scheduler 111 is connected to a storage device 113 (e.g. a set of hard-disk drives), and to a selector (SEL) 115. The information data store 103 is also connected to a content source (CS) 117. The content source 117 provides for example at least audio/video information in a broadcasting or on-demand fashion. In addition, the content source 117 may provide information data, e.g., EPG information inside the vertical blanking interval of the video signal, or MPEG-7 metadata on segments of a particular content item (e.g. the scene boundaries of a movie). The content source 117 is connected to the selector 115 comprising at least one set of content isolation means (e.g. a tuner or the like) which allows to isolate one or more content items for recording on the storage device 113. The output of the selector 115 is connected to the storage device 113.

The operation of the apparatus of FIG. 1 will now be described. Information data of a current content item to be played out on a personalized content channel is gathered from the source (Internet) 101 or obtained via other means, e.g., via transmission in the veritcal blanking interval of an analog TV broadcast signal or via digital video broadcast (DVB) transport streams, or combinations of any of the above. The content item may be a TV program, data stream containing Video and/or audio data or a segment of a program etc.

The information data may comprise a plurality of attributes and attribute values associated with the content item such as title, actors, director and genre. Each profile 109 is based on the information data together with data indicating the "like" or "dislike" of the user. The rating of a "like" and "dislike" can be based on feedback or content items that pass the associated pre-selection filter 105. This feedback can be given as explicit rating by the users that use the particular personalized content channel. The ratings can be made in several ways. For example, the user can, using a remote control device, indicate for a currently selected content item or a given attribute of the current content item his rating ("like" or "dislike") by pressing appropriate buttons on a user interface (e.g. the remote control device) whilst bearing the current content item. Alternatively, the behaviour of the user can be observed. For example, if the user watches a current content item for more than a predefined time interval (for example, 20 minutes), this could automatically indicate "like". In a more advanced setting, a "like" degree on a discrete or continuous scale can be provided or calculated instead of just a binary "like" or "dislike" classification.

When information data of a content item passes the filter 105, this information data is forwarded to the biased recommender engine 107. The biased recommender engine calculates a biased "like" degree or rating, based on its associated profile 109, for this subsequent content item. The information data associated to the subsequent content item is then forwarded, along with the computed rating, to the scheduler 111, which subsequently computes recording schedule that will be used to schedule the recording of content items offered by the recommender engine 107 onto the storage device 113. In particular, the scheduler 111 may primarily consider the content items of high like degree or rating while still considering sufficient new content for each personalized content channel. To this end, the recording schedule computed by the scheduler 111 is used to instruct the scheduler 115 to select the content items available from the content source 117 to record them on the storage device 113.

Use or user profiles can be derived using three basic methods: implicit profiling; explicit profiling; and feedback profiling. Implicit profiling methods derive content use profiles unobtrusively from the user's use histories, e.g., sets of TV shows watched and not watched. Explicit profiling methods derive content use profiles from user's answered questions as that include explicit questions about what the user likes and dislikes. Feedback profiling methods derive use profiles from content items for which a user has provided ratings of the degree of like or dislike.

According to the embodiment, the biased recommender engine 107 comprises a biasing unit, component or function which is adapted or configured to provide a biased output so as to favour newly added services and content sources. The bias can be applied by a correction value which is combined with the recommender output. This correction value may decay in time and/or with the number of ratings given to content items by the user or by the recommender received from the new content service. Thereby, the probability that content from a new source is recommended to the user can be increased, since the biased output can ensure that a content item from a newly acquired service (i.e. content source) is preferred even if the recommender's profile 109 does not contain any ratings related to the newly acquired service.

Figure 2:
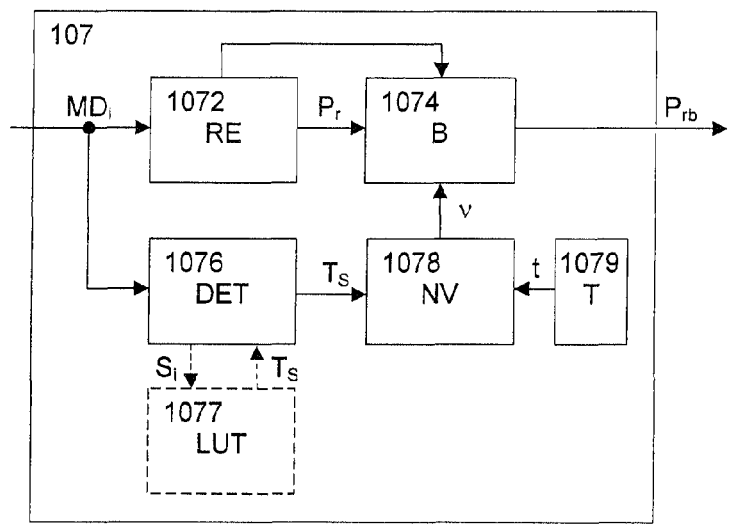
FIG. 2 shows a schematic block diagram of a biased recommender according to an embodiment of the present invention.

FIG. 2 shows a schematic block diagram of an implementation example of the biased recommender engine 107 of FIG. 1. The components or blocks shown in FIG. 2 may be implemented as hardware circuits or components or, alternatively, as software routines stored in a memory of a computer or processor device.

When a new content item is available, its features or metadata $MD_i$ are supplied to a recommender (RE) 1072 which calculates or determines a predicted rating, for example in the form of a posterior probability $P_r$ in the range [0, 1] which thus indicates a like-degree of the given content item for a user (e.g. where "0" indicates "dislike" and "1" indicates "like"). This probability $P_r$ is supplied to a biasing unit (B) 1074 which applies a bias (e.g. correction value) to the probability $P_r$ depending on an age degree or novelty degree of the content source from which the concerned content item has been received. It is noted that the term "content source" can be interpreted as any service or source from which a content item is received, e.g., a broadcast channel or video-on-demand service or the like.

Thus, each content source (e.g. the content source 117 of FIG. 1) can be characterized by a novelty value or other kind of age parameter that indicates how long the content source has been available in the current recommender system.

In the present implementation example, the novelty value of a content source may be selected as a real number between "0" and "1". The novelty value can be set to "1" when the content source is added to the system for the first time, and therefore is to be regarded as a new content source. Additionally, a processing may be provided to decrease the novelty value (e.g. in a linear or exponential manner) with time and/or with the amount of ratings given to content items stemming from a concerned content source. Thereby, novelty of a content source and thus the bias or correction value decays with time. A biased or corrected probability $P_{r,b}$ is thus obtained from the biasing unit 1074.

As can be gathered from the implementation example of FIG. 2, the biasing unit 1074 may have two control inputs for controlling the correction value or bias. On one hand, a novelty value v may be supplied from a calculator 1078 and, on the other hand, an additional or alternative control output of the recommender 1072 may be used to indicate an amount of ratings received from the user or generated by the recommender 1072 for the concerned content item. This control value may be derived from a look-up table (not shown) managed by the recommender system or from a service profile of the user.

The metadata $MD_i$ of the concerned content item is also applied to a determinator (DET) 1076 which derives a source identification or identity $S_i$ from the metadata $MD_i$ and determines a subscription time $T_s$ at which the user has subscribed to the content service from which the concerned content item has been received. The subscription time $T_s$ may be directly supplied by the metadata $MD_i$ or may be derived from a look-up table (LUT) 1077 which can be updated by the recommender system whenever a user subscribes to a new content source.

The subscription time $T_s$ is then supplied to the calculator (NV) 1078 which calculates the novelty value v based on the subscription time $T_s$. This can be achieved by comparing the subscription time $T_s$ to an actual time t obtained from a timer 1079 which may be provided at the biased recommender engine 107 or somewhere else in or at the recommender system.

For example, given a content item i, with source identity $S_i$, its novelty value at an instant t≥0 after the moment of subscription ($T_0$, t=0) is given by:

$$v(t) = \begin{cases} 0 & \text{if } t \geq T_0 \text{ and } t < T_S \\ 1 - \frac{t - T_S}{T_0 - T_S} & \text{if } T_S \leq t < T_0 \end{cases} \quad (1)$$

Where $T_0 > T_s$ is the time after subscription to a new content source, at which a new content source cannot be considered novel anymore.

Assuming that the above posterior probability for the present content item i is given by $P_r(+|i)$, the biased posterior probability $P_{rb}(+|i)$ is given by:

$$Pr_b(+|i) = v(S_i,t) \cdot 1 + (1 - v(S_i,t)) \cdot Pr(+|i) \quad (2)$$

To thereby provide a gradual change from a maximal probability $P_{rb}=1$ to the actual posterior probability $P_r$ as time progresses.

In recommender systems where content access is mediated not only by a recommender engine, but also by a pre-selection filter that pre-selects content items (e.g. by means of logic rules) before they are evaluated by the recommender engine (such as the pre-selection filter 105 of FIG. 1), the recommender system may be configured to provide a control structure where the addition of a new content source triggers an update of the pre-selection filter so that content items from the new content source can pass the pre-selection filter. As an example, it is assumed that a predetermined personal "western" channel is defined to filter out all movies but western movies, broadcast on a number of predefined channels. If a user now subscribes to a new video-on-demand service, the pre-selection filter of the "western" channel can be updated or extended to include the new video-on-demand service as a new content source.

Additionally, in systems where multiple pre-selection filters (each connected to its own recommender engine) are used to define "virtual" or "personal" channels, a subscription to a new service may trigger a dialogue with the user to select one or more appropriate virtual channels or to create a new virtual channel (thus instantiating a new pre-selection filter) to which the new service or content source should contribute.

For each selected virtual channel, filter definitions or parameters can be updated to allow inclusion of appropriate or desired content items from the new content source. In this, case, the above mentioned biasing functionality of the biased recommender engine can be applied to each selected virtual channel.

It is noted that the present invention can be applied to any recommender system for set-top boxes, TV sets, mobile phones, personal digital assistants (PDAs), personal computers (PCs) and all devices where recommenders are used to collect, filter, and present content items from multiple sources to their users. The invention is thus not restricted to recommenders of television or film content, but can be applied to music, theatre shows, books and all types of products and services for which recommenders can be built.

In summary, the present invention relates to an apparatus, a method and a computer program product for controlling a recommender system, wherein a bias is applied to the output of a recommender in order to favour newly added services and content sources. The bias may decay in time and/or with the number of ratings given to content coming from the new service.

While the invention has been illustrated and described in detail in the drawings and the foregoing description, such illustration and description are to be considered illustrative or exemplary and not restrictive. The invention is not limited to the disclosed embodiments. From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. A single processor or other unit may fulfill at least the functions of FIG. 2 based on corresponding software routines. The computer program may be stored/distributed on a suitable medium, such as an optical storage medium or a solid-state medium supplied together with or as part of other hardware, but may also be distributed in other forms, such as via the Internet or other wired or wireless telecommunication systems. The mere fact that certain measures are recited in mutually different dependent claims does not indicate that a combination of these measures cannot be used to advantage. Any reference signs in the claims should not be construed as limiting the scope thereof.

What is claimed is:

1. A biased recommender apparatus for controlling a recommender system, said apparatus comprising a signal processing device, a computer device, or a chip, and at least one memory including a software routine or program, the at least one memory and the software routine or program configured to with the signal processing device, computer device, or chip, cause the apparatus to:
    a) calculate, based on information data of a content item together with data indicating like or dislike of a user, a predicted rating value for a content item received from a content source;
    b) determine an age of subscription to said content source so as to derive an age parameter of said content source; and
    c) apply a correction value to said predicted rating value based on said age parameter in order to favour content items of new content sources.

2. The apparatus according to claim 1, wherein said determining an age of subscription determines a subscription time based on metadata, and calculates said age parameter based on said subscription time and an actual time.

3. The apparatus according to claim 2, wherein said determining an age of subscription determines said subscription time by accessing a look-up table.

4. The apparatus according to claim 1, wherein said applying a correlation value to said predicted rating value decreases said correction value with increasing age parameter or with increasing number of rating values for received content items of said content source.

5. The apparatus according to claim 4, wherein said applying a correlation value to said predicted rating value decreases said correction value in a linear or exponential relation to time or said number of rating values.

6. The apparatus according to claim 1, wherein said calculating a predicted rating value calculates said predicted rating value in a range [0, 1].

7. The apparatus according to claim 1, wherein said age parameter is a novelty value which indicates how long said content source has been available in said recommender system.

8. The apparatus according to claim 7, wherein said novelty value is a positive real number less or equal to 1.

9. The apparatus according to claim 1, wherein said correction value results in a higher rating value for younger subscriptions.

10. A method of controlling a recommender system, said method comprising:
   a) calculating, based on information data of a content item together with data indicating like or dislike of a user, a predicted rating value for a content item received from a content source;
   b) determining an ace of subscription to said content item so as to derive an age parameter of said content source; and
   c) applying a correction value to said predicted rating value based on said age parameter in order to favour content items of new content sources.

11. The method according to claim 10, further comprising triggering an update of a content pre-selection filter in response to an addition of a new content source.

12. The method according to claim 10, further comprising triggering in response to an addition of a new content source, a user input operation for creating a new channel with pre-selection filter to the new content source.

13. A computer program product comprising producing signal processing device, or computer device, or chip, and at least one memory including a software routine or program, the at least one memory and the software routine or program configured to with the signal processing device or computer device, cause the computer program product at least to perform the steps of method claim 10.

* * * * *

UNITED STATES PATENT AND TRADEMARK OFFICE
CERTIFICATE OF CORRECTION

PATENT NO.         : 8,700,556 B2
APPLICATION NO.    : 12/998947
DATED              : April 15, 2014
INVENTOR(S)        : Barbieri et al.

Page 1 of 1

It is certified that error appears in the above-identified patent and that said Letters Patent is hereby corrected as shown below:

In the Claims

1. At column 9, line 16, claim 10, line 7 please remove the word "ace" and replace with the word --age--.

Signed and Sealed this
Twenty-third Day of September, 2014

Michelle K. Lee
*Deputy Director of the United States Patent and Trademark Office*